United States Patent
Blanchet

(10) Patent No.: US 7,871,228 B2
(45) Date of Patent: Jan. 18, 2011

(54) DEVICE FOR STOWING A ROAD VEHICLE ON A BEARING PLANE SO THAT IT CAN BE TRANSPORTED BY ANOTHER VEHICLE

(75) Inventor: Bertrand Blanchet, Oberschaeffolsheim (FR)

(73) Assignee: Lohr Industrie, Hangenbieten (FR)

( * ) Notice: Subject to any disclaimer, the term of this patent is extended or adjusted under 35 U.S.C. 154(b) by 344 days.

(21) Appl. No.: 12/129,089

(22) Filed: May 29, 2008

(65) Prior Publication Data
US 2008/0232918 A1     Sep. 25, 2008

Related U.S. Application Data

(63) Continuation of application No. PCT/FR2007/000617, filed on Apr. 12, 2007.

(30) Foreign Application Priority Data

Apr. 13, 2006    (FR) .................................. 06 03277

(51) Int. Cl.
*B60P 7/08* (2006.01)
(52) U.S. Cl. ............................. 410/20; 410/10; 410/12; 410/23
(58) Field of Classification Search ...................... 410/7, 410/9–12, 19–23, 97, 100; 254/217, 223, 254/369; 248/499
See application file for complete search history.

(56) References Cited

U.S. PATENT DOCUMENTS

| 4,147,113 | A |   | 4/1979 | Kilgus et al. |
| 4,786,223 | A | * | 11/1988 | Crissy et al. ................... 410/20 |
| 5,836,730 | A |   | 11/1998 | Boydstun, IV et al. |
| 6,848,871 | B1 |   | 2/2005 | Cottrell |
| 7,114,897 | B1 |   | 10/2006 | Boydstun, IV et al. |
| 7,484,917 | B2 |   | 2/2009 | Howes |

FOREIGN PATENT DOCUMENTS

DE     19712756 A1    10/1998
EP      0311543 A1     4/1989

* cited by examiner

*Primary Examiner*—Stephen Gordon
(74) *Attorney, Agent, or Firm*—Davis & Bujold, P.L.L.C.

(57) ABSTRACT

The device (1) for stowing a vehicle when it is transported on a bearing plane (9) by one of its wheels or from an anchorage on the chassis is characterized in that it is constituted by the following means: a link (2) that has a coupling end (5) provided to engage with a tensioning and retaining mechanism (3), a tensioning end (6), and a sliding sheath (7) for support on a tyre, a mechanism for tensioning and retaining the link (2) that has a roll axis (10) of sufficient length to offer numerous transverse coiling positions of the strap, and a coupling and return assembly (4) passed through by the link (2). Said device therefore enables vehicles to be stowed in two ways: a) by coupling to the vehicle chassis and b) by stowing the vehicle by link (2) on its tyres. This invention relates to the transportation of vehicles on Lorries or railway trucks.

30 Claims, 6 Drawing Sheets

DEVICE FOR STOWING A ROAD VEHICLE ON A BEARING PLANE SO THAT IT CAN BE TRANSPORTED BY ANOTHER VEHICLE

This application is a continuation of International Application PCT/FR2007/000617 which was filed Apr. 12, 2007, which in turn claims priority from French patent application serial no. 0603277 filed Apr. 13, 2006.

FIELD OF THE INVENTION

The invention relates to a device for securing a road vehicle on another vehicle so that it can be transported on a bearing plane of this other vehicle.

BACKGROUND OF THE INVENTION

The invention comes within the domain of securing road vehicles as loads on loading planes of trucks or freight cars.

When transporting cars and, more generally, road vehicles on trucks or freight cars specifically for this use, the vehicles transported are secured on bearing planes to guarantee that they do not move during travel.

This necessity stems from the often sudden jolts of certain amplitude experienced by the chassis of the truck or the freight car while moving and to flaws in the roads or railroad tracks.

There are currently two main ways to go about this.

The first consists in securing the vehicle by its wheels and, more precisely, by its tires, thus allowing its suspension to bounce freely.

The second, as indicated below, uses connections between the chassis of the vehicle and the bearing plane on which the vehicle rests. The suspension of the transported vehicle is then compressed by the strong pull force of the connection, making it possible to keep it taut regardless of the movements of the chassis of the truck or the freight car.

In the first case, securing the vehicle by its wheels is done either on the wheels or, more generally, by means of a flat link that immobilizes the tire directly or by means of a part bearing a strap. The strap is stretched between a low fixed end point situated, for example, in front of the tire, generally by hooking onto or into the structure of the bearing platform, and another low fixed point situated, for example, close to and behind the tire. Using a tensioning device the strap is tensioned enough to immobilize the wheel against its bearing support.

This system has been largely perfected over the many years since it was created.

Thus, the disadvantage due to the movement of the strap resulting from its tensioning and from the slight collapse of the tire was eliminated by using sliding sheaths or sleeves or loop structures or swiveling means for rolling on the tire.

These types of securing methods have many advantages.

The first has to do with the lightness of the assembly, which represents only a minimum amount of extra weight for the truck and is easy and fast to use.

Another advantage is the small amount of strength necessary for assembly, for the vehicle is sufficiently immobilized with average tension and the only resistance to be overcome is that of the tire.

Finally, the cost of the assembly appears entirely reasonable.

The second means is still often used in certain countries.

The links used are primarily chains that traditionally offer the best mechanical strength, but cables are also used.

This second means has two significant disadvantages. On the one hand, chains and even cables constitute additional weight to be transported and used; on the other hand, their weight and the necessity of compressing the suspensions requires considerable effort which results in fatigue and, as a result, in risks for the operators, as well as less attention to and less precision in their actions.

From both an economical and work safety standpoint, these disadvantages lead to a need for a device for securing to the chassis that is light, effective and easy to use.

Furthermore, chain or cable systems cannot be adapted to wheels or tires due to the damage that may cause.

SUMMARY OF THE INVENTION

This invention aims to eliminate these disadvantages and to add other advantages by proposing a dual-purpose securing device using a strap making it possible to secure a vehicle on a bearing plane for each strap via one of its wheels and from at least one anchoring point on the chassis.

In general, this invention consists of a strap or an analogous component equipped with coupling or contact means completed by a tensioning device to be mounted on the bearing plane, preferably at the end and on the underside of this bearing plane.

The dual-purpose securing device according to the invention is made up of the components indicated above and detailed below.

A strap and more generally a link, one of whose ends has a retaining hook that is attached to an opening of the bearing plane, for example, in the form of perforated plate, and whose other end is free and tensioned, the strap or the link comprising a means of engaging the tire, which it moves and by which it presses on this tire to immobilize it.

A manually activated tensioning and retaining mechanism of sufficient length to offer numerous transverse winding positions for tensioning the strap in alignment with the wheel or in alignment with the anchoring point to the chassis.

A mobile coupling and transmission assembly formed of two separable parts that slot together or fit into each other, making it possible to secure the vehicle being transported at a point of its chassis.

This securing device has the cumulated advantages of securing the vehicle, via a strap on the wheel, and the advantages of securing the vehicle, via an anchoring point on the chassis, without having the disadvantages of adding additional weight or being difficult to use.

BRIEF DESCRIPTION OF THE DRAWINGS

Other features and advantages of the invention will be clarified by the following description, which refers to the appended drawings, in which.

DETAILED DESCRIPTION OF THE PREFERRED EMBODIMENTS

The securing device according to this invention will now be described in detail by referring to FIGS. 1 through 10. Equivalent items shown in the different figures will have the same numerical references.

Figure 1:
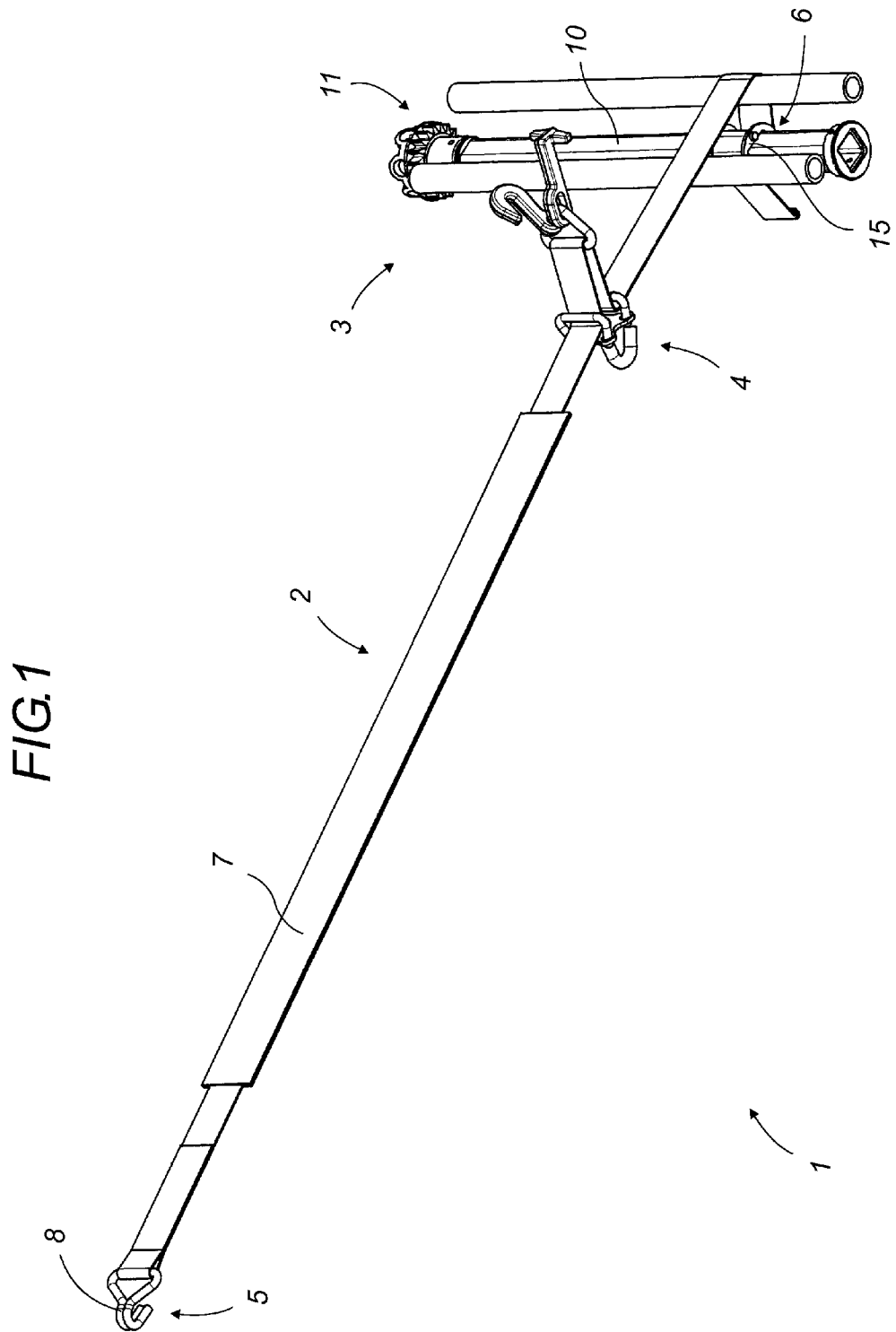
FIG. 1 is a perspective view of the securing device according to the invention.

The securing device 1, as shown in its entirety in FIG. 1, generally consists of a link and more specifically a strap 2 or analogous component, a tensioning and retaining mechanism 3 for the link and a coupling and transmission assembly 4 passed through by the link.

Hereinafter we will use the term "strap," since it is more general and covers all suitable types of links.

The strap 2 or analogous component has a coupling end 5 and another end, for example a tensioning end 6 provided to engage with the tensioning and retaining mechanism 3 of the strap 2. This strap or analogous component also has one or more means of contact against the tire, for example in the form of a sliding sheath 7 or several transversal support bars.

Its coupling end 5 preferably comprises a hook 8 or analogous component making it possible to secure this end 5 of the strap 2 and attach it detachably to the bearing plane 9 on which the vehicle rests, generally by hooking it into an opening of the structure of the plane or of the bearing platform 9.

The sliding sheath 7 for contact with the tire is preferably of a length roughly equal to half the circumference of a tire and makes it possible to avoid transferring the movement of the strap 2 resulting from its tensioning and the slight compression of the tire to the tire. This can preferably be a sleeve made of a very resistant material, preferably elastomer, inside which the strap 2 slides.

The tensioning and retention mechanism 3 of the strap 2 is provided to tension it after it is immobilized and wound, then to keep it taut.

Figure 3:
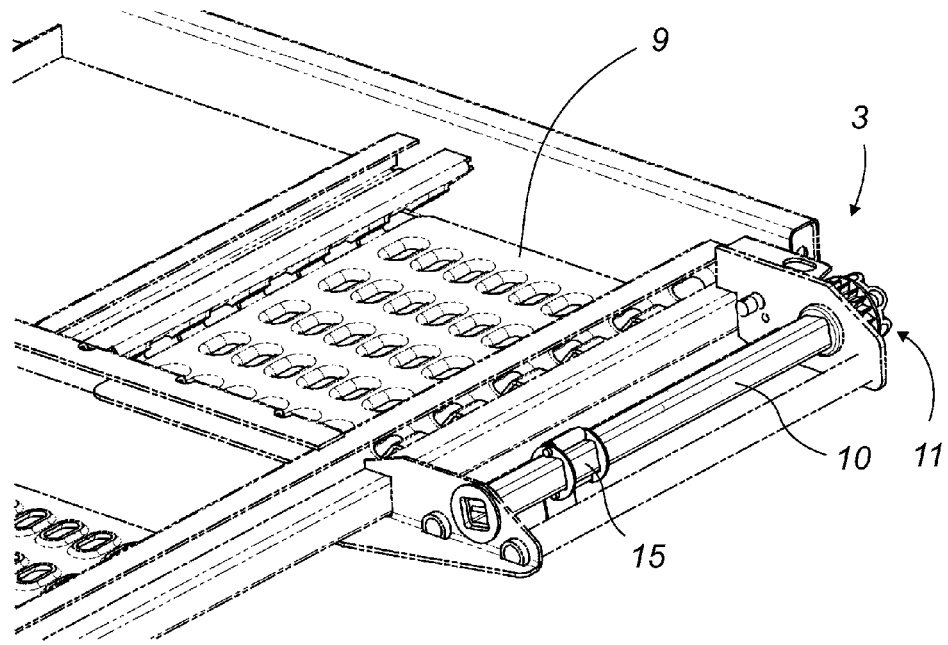
FIG. 3 is a top perspective view of a tensioning and retaining device of the invention shown mounted under a bearing plane.
Figure 4:
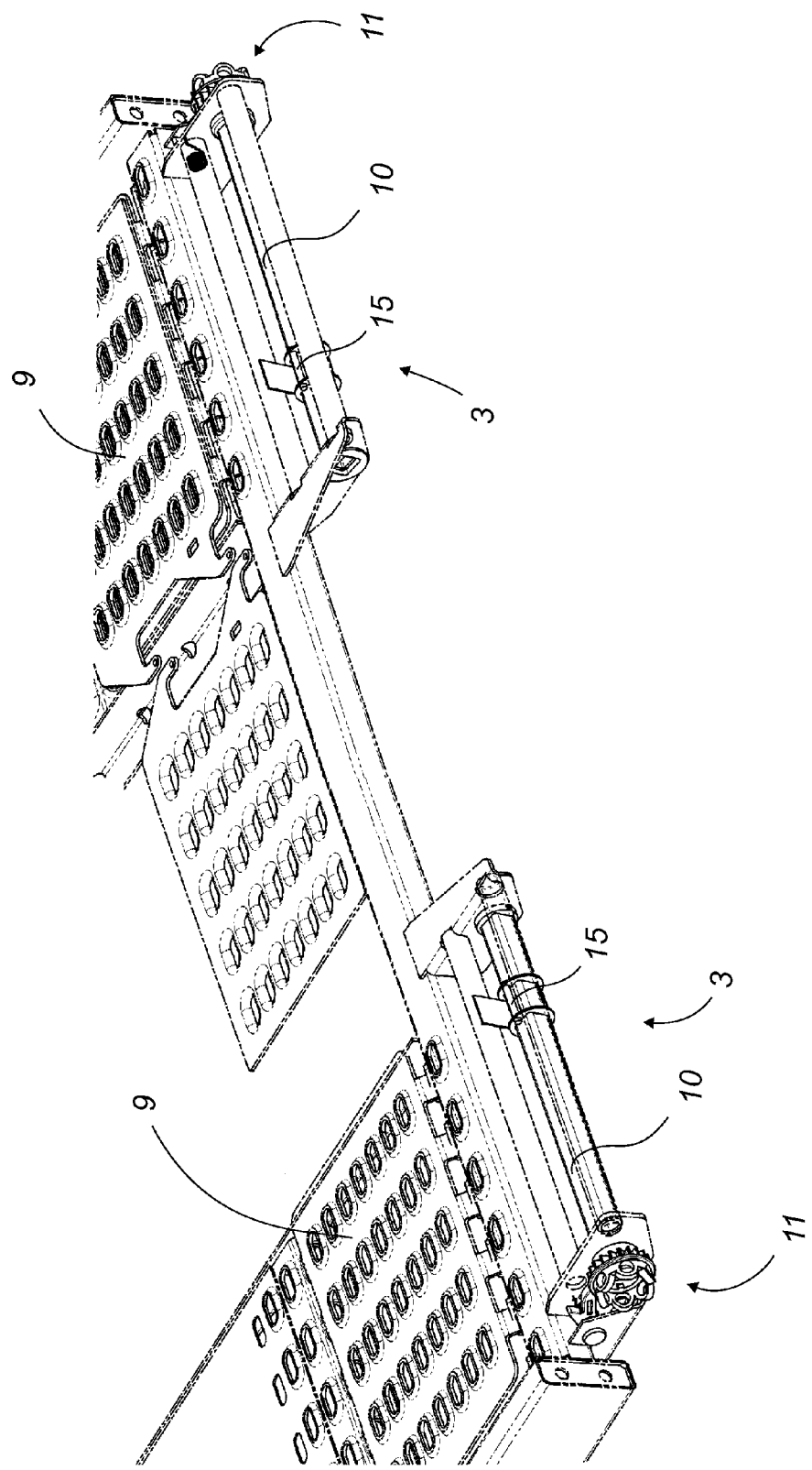
FIG. 4 is a top perspective view of two tensioning and retaining devices of the invention, each shown mounted under a separate bearing plane of the same vehicle.
Figure 5:
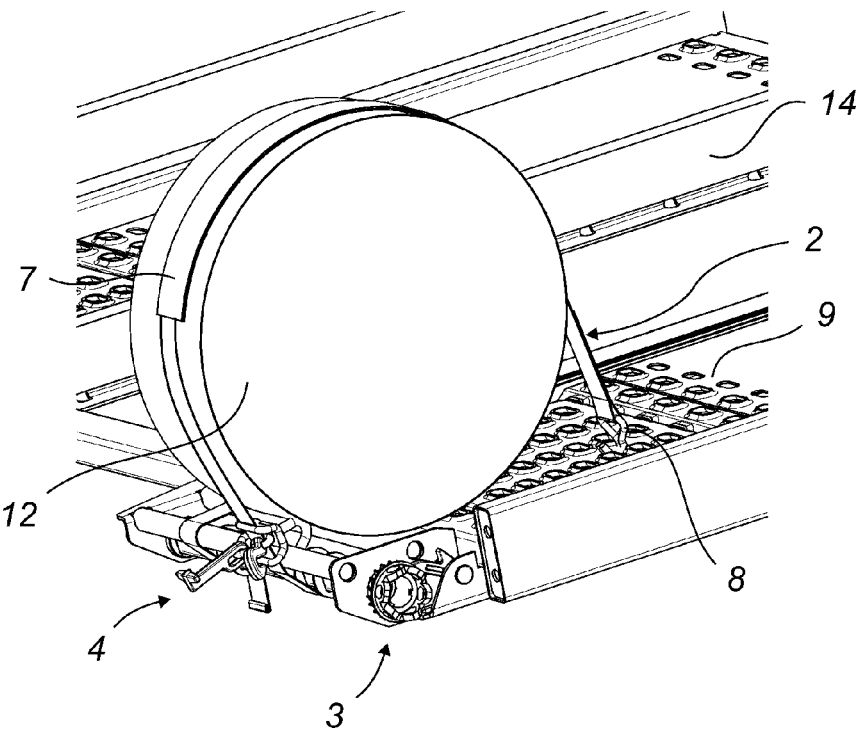
FIGS. 5 and 6 are schematic perspective views of parts of a vehicle immobilized on a bearing plane simultaneously by one of its wheels and by an anchoring point to the chassis using two securing devices according to the invention.
Figure 6:
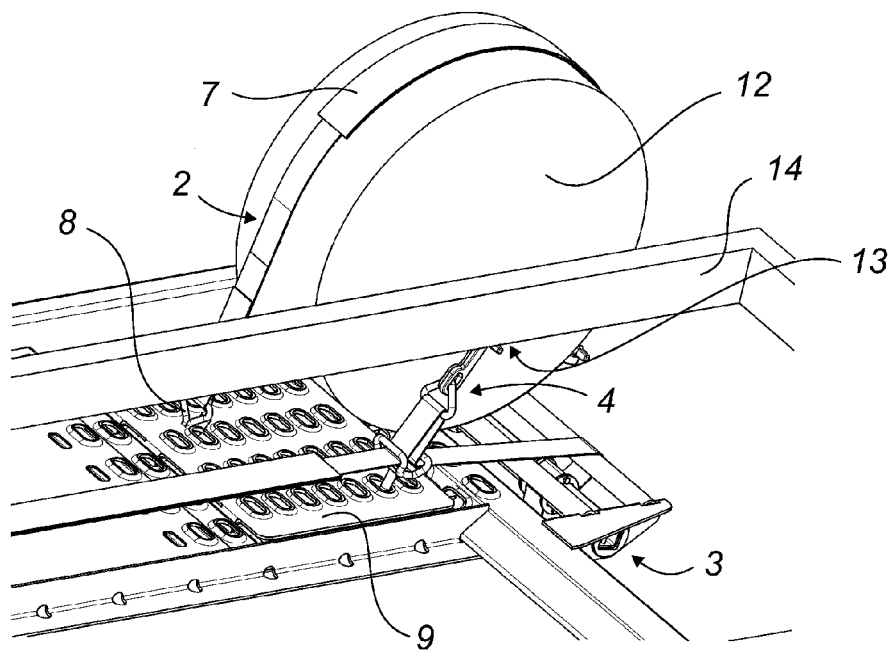

In a particular but non-limiting embodiment of the invention, shown in more detail in FIGS. 3 and 4, the tensioning and retaining mechanism 3 has a winding axle 10 preferably rotated by a mechanism 11 with a locking device, for example a ratchet or analogous mechanism making it possible to lock the winding axle 10 in position to prevent it from rotating in the opposite direction so that the strap 2 can be tensioned and be kept taut.

In one embodiment of the invention, the tensioning and retaining mechanism 3 comprises a winding axle 10 that is long enough to offer numerous transversal winding positions for the strap 2 so that the strap can be tensioned strictly in alignment with the wheel 12 and in alignment with the anchoring point 13 to the chassis 14 of the vehicle.

In this embodiment, the section of the winding axle 10 is non-circular and may comprise one or more sliding winding components 15 provided to secure the tensioning end 6 of the strap 2. This winding component 15 has, for example, a central passage with a non-circular section through which it is mounted on the winding axle 10 and whose section has a shape that is complementary to that of this winding axle 10 so that the rotation of this axle drives the sliding winding component 15 so that it rotates at the same time to wind the strap 2.

The tensioning and retaining mechanism 3 may be incorporated in the structure of the plane or the bearing floor of the vehicle, preferably at the end of this structure.

The tensioning and retaining mechanism 3 is shown as being built onto the end of the bearing plate 9 or mounted onto it. It is clear that this can be done so that it can be detached from the platform or the bearing floor 9 of the vehicle, that is, so that it is removable and can be attached there temporarily in the appropriate spot, particularly simultaneously through a number of through-perforations existing in its structure.

It is thus possible to envision several variants with removable tensioning and retaining mechanisms 3 and ratchet mechanisms whose mechanism would be mounted or temporarily attached to the plane or the bearing platform in an appropriate location.

Figure 2:
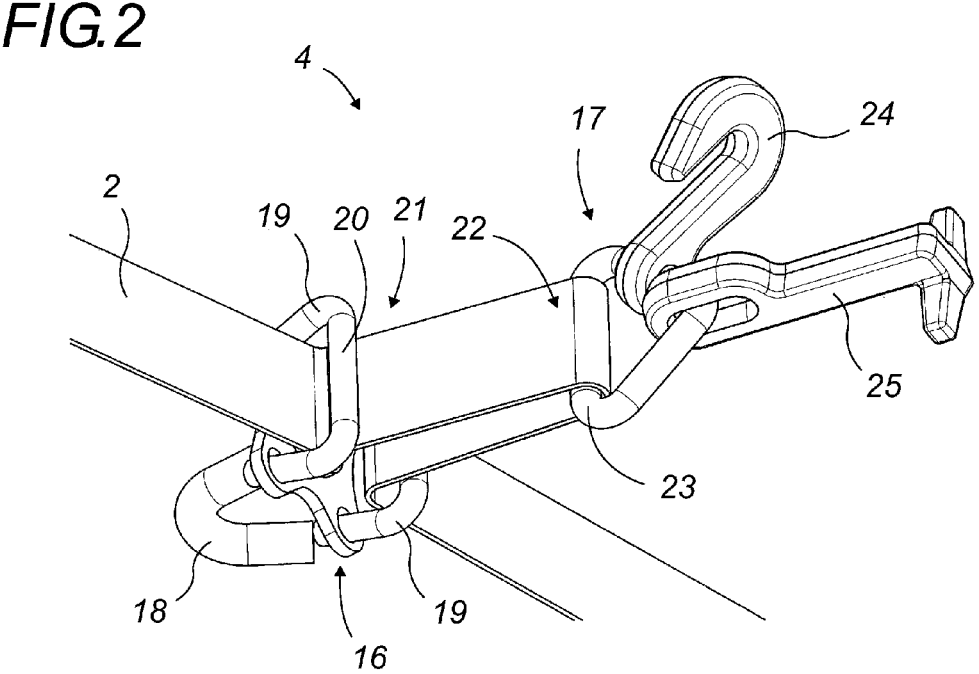
FIG. 2 is a perspective view of a coupling and transmission assembly according to the invention whose two separable parts are connected by the strap of the securing device.

One embodiment of the coupling and transmission assembly 4 is shown in detail in FIG. 2.

In a preferred embodiment, this assembly 4 comprises two separable parts, a support having a retaining means, for example a hook, called hook holder assembly 16 and a separable transmission part 17.

The coupling and transmission assembly 4 is borne and mounted so that it moves, for example by slipping, sliding or rolling along the strap 2 for the purpose of making adjustments or picking up slack or for various other reasons.

In a preferred embodiment of the invention, the hook holder assembly 16 has on its front face at least one retaining means, a hook, for example, preferably a swivel hook 18. The hook holder assembly 16 has at each of its raised ends a rolling, sliding or slipping surface, for example a rolling axle or an inverted U-shaped branch 19 and 20 or any other support that bears the rolling, slipping or sliding strap 2. Between these two ends, the support is shaped to offer a receiving space 21 in which the separable return part 17 can be housed, fitted or nested making it possible, as is seen in the figures, to create a loop 22 with the strap 2 shifting the movement upward.

This arrangement makes it possible to produce a basic upward block and tackle.

In effect, the hook holder assembly 16 forms with the strap 2 a downward movement transmission module when the hook 18 hooks onto or into the bearing plane 9.

The separable transmission part 17 also comprises a slipping, sliding or rolling surface that bears the slipping, sliding or rolling strap while it moves. This may also be a U-shaped branch or a rolling axle 23.

The separable transmission pail 17 is intended to be attached by at least one anchoring point 13 to the chassis 14, either directly or via a hook 24 or an adapter 25 mounted on this hook 24 or any other suitable existing part available on the market to create an upward transmission movement module with the strap 2.

As for the tensioning and retaining mechanism, this may be a tensioning device integrated in the strap or inserted in the length of this strap as a segment. It is also possible to imagine a ratchet winder or any other equivalent device.

According to this last device, the second end of the strap is no longer wound up in the mechanism at the end of the chassis, but is hooked or attached directly to the end of the chassis or in another location.

Using the means above offers the possibility of a dual use, namely of using either of the two securing methods but also of using them simultaneously on the same vehicle.

We will now describe the operation of the device 1 according to the invention for securing a vehicle while it is being transported on the bearing plane 9.

Two distinct but also simultaneous configurations for securing vehicles are possible. They are shown in simplified form in FIGS. 7 through 9.

Figure 7:
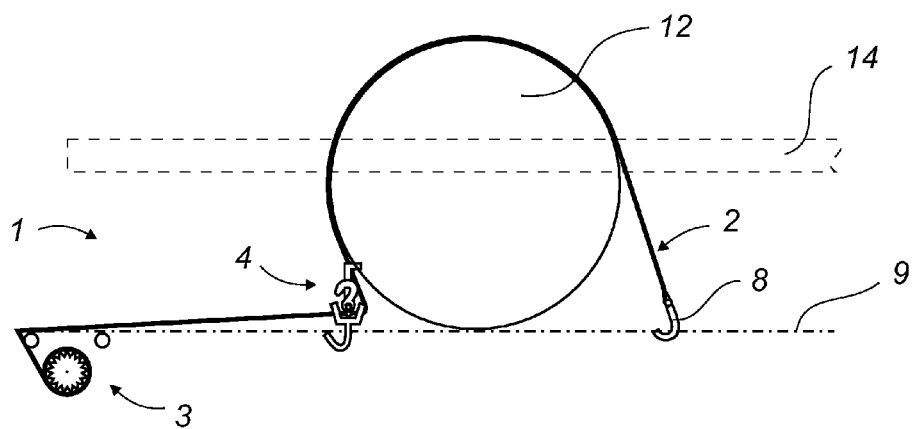
FIG. 7 is a side schematic view of a wheel immobilized on a bearing plane by the securing device according to the invention.
Figure 8:
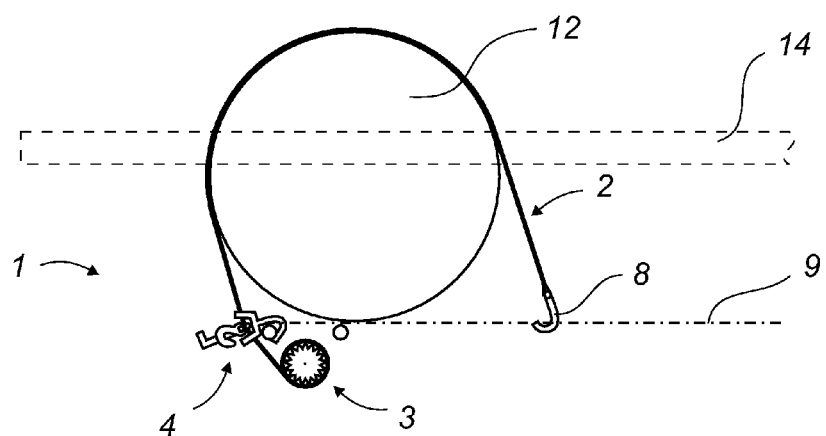
FIG. 8 is a side schematic view of a wheel immobilized at the end of a bearing plane by the securing device according to the invention.
Figure 9:
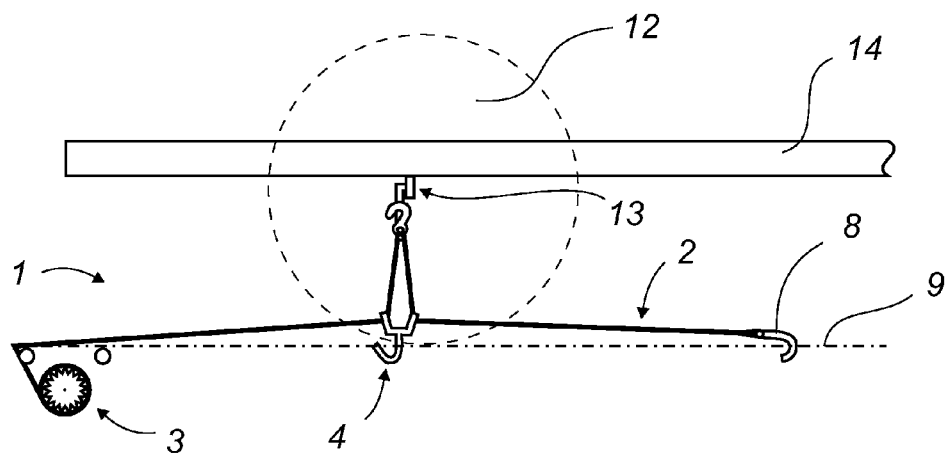
FIG. 9 is a side schematic view of a vehicle chassis immobilized on a bearing plane by the securing device according to the invention at an anchoring point to the chassis.
Figure 10:
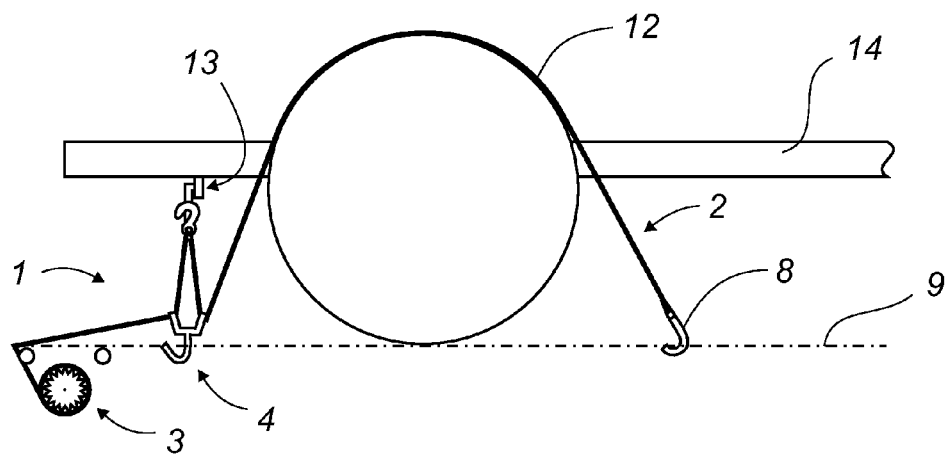
FIG. 10 is a side schematic view illustrating the dual, simultaneous use allowing immobilization via the wheels and via the chassis.

First, securing via the wheels wherein the strap is tightened around the tire (FIGS. 7 and 8).

The strap 2 is hooked by the coupling end 5 onto or into an opening of the bearing plane 9. It is placed over the tire of the wheel 12 via its sliding support sheath 7.

The coupling and transmission assembly 4 is coupled by its hook 18 close to the tire of the wheel 12. The separable return part 17 is retracted in the hook holder assembly 16.

When the wheel is far away from the tensioning device 3 (FIG. 7), the strap 2 extends roughly flat up to the tensioning device 3 on the winding axle 10 and its tensioning end 6 is wound in a position that is preferably in alignment with the tire of the wheel 12. When the wheel 12 is close to the tensioning device 3 (FIG. 8), the strap 2 extends roughly vertically up to the tensioning device 3.

Securing is achieved by tensioning the strap 2.

Second, securing by hooking to an anchoring point of the chassis of the carrier vehicle.

The coupling end 5 of the strap 2 is hooked onto or into the bearing plane 9 at a certain distance from the anchoring point or points 13.

The coupling and return mechanism 4 is hooked onto or into the bearing plane 9 by the hook 18 of the hook holder assembly 16, approximately at the anchoring point 13.

The separable return part 17 is hooked to the anchoring point either directly or via the hook 24 or the adapter 25 forming the flat transmission loop 22 between the two ends 19 of the hook holder assembly 16.

The length of the strap 2 makes it possible to connect it to the tensioning mechanism 3 on the winding axle 10 and its tensioning end 6 is preferably wound in alignment with the anchoring point 13, that is, at a certain distance from the position corresponding to the first configuration.

Securing is achieved by tensioning the strap 2 and keeping it taut.

Third, dual securing via the wheels and one or more anchoring points of the chassis of the carrier vehicle.

It is necessary to note that the securing device 1 of the invention makes it possible to provide two means for securing a same vehicle, regardless of the position of its wheels or its anchoring points with respect to the bearing plane 9.

Of course, other embodiments may be envisioned by a person skilled in the art without deviating from the general principle of the invention.

Thus, for example, it is possible to replace the strap 2 with any other smooth or hinged flexible and resistant linking component, a tether, a cable or a composite structure, for example, and to use other types of structures for the bearing plane. Attachment to the chassis can be achieved at several anchoring points with the same strap.

The invention claimed is:

1. A device (1) for securing a transported vehicle when the transported vehicle is being transported on a bearing plane (9) by at least one of a wheel (12) and at least one anchoring point (13) of a chassis of the transported vehicle (14), the device (1) comprising a link with a coupling end (5) for coupling to the bearing plane (9) and a tensioning end (6) that cooperates with a tensioning and retaining mechanism (3) of the link, and between the coupling end (5) and the tensioning end (6), an area intended to secure the transported vehicle on the bearing plane (9), between the coupling end (5) and the tensioning end (6) of the link is a coupling and return assembly (4) of the link comprising a means of attachment for immobilizing the assembly (4) on the bearing plane (9), the assembly (4) being passed through by the link and being able to move on and along the link and having a means of retention separable from the assembly (4) and one of passed through and borne by the link and capable of forming with the link an attachment with at least one anchoring point (13) for securing the transported vehicle via its chassis during transport, thus making it possible to maintain the assembly (4) on the bearing plane (9) to form a second attachment for the link to the bearing plane, the link being capable of immobilizing the transported vehicle by pressing down on a tire of the wheel, and thus also or additionally making it possible to send the link upwards to create, by tensioning the link using the tensioning and retaining mechanism (3), a downward tractive force applied to the chassis of the transported vehicle.

2. The securing device according to claim 1, wherein the link is flat.

3. The securing device according to claim 2, wherein the link is a strap (2).

4. The securing device according to claim 1, wherein the means of retention separable from the assembly (4) is a swivel hook (18).

5. The securing device according to claim 1, wherein the tensioning and retaining mechanism (3) of the link is removable.

6. The securing device according to claim 1, wherein the tensioning and retaining mechanism (3) is inserted in the link between the assembly (4) and the tensioning end (6) of the link.

7. The securing device according to claim 1, wherein the tensioning and retaining mechanism (3) is a ratchet winder.

8. The securing device according to claim 1, wherein the tensioning and retaining mechanism (3) of the link comprises a winding axle (10) sufficiently long enough to provide numerous transversal winding positions for the link in order to be able to tension the link in alignment with the wheel (12) but also in alignment with the anchoring point (13) of the chassis (14) of the transported vehicle.

9. The securing device according to claim 1, wherein the coupling end (5) of the link comprises one of a hook or other component (8) which facilitates securing the coupling end (5) of the link (2) to the bearing plane (9) on which the transported vehicle is supported during transport.

10. The securing device according to claim 1, wherein a sliding sheath (7) is made of a resistant material in which the link (2) is inserted so that the link (2) slides inside the sheath (7) and fits around the tire of the wheel (12).

11. The securing device according to claim 1, wherein the tensioning and retaining mechanism (3) is integrated in the structure of one of the bearing plane or a bearing floor of a transported vehicle.

12. The securing device according to claim 11, wherein the tensioning and retaining mechanism (3) is integrated in the structure of one of the bearing plane or the bearing floor of the transport vehicle at an end of the structure.

13. The securing device according to claim 1, wherein the means of attachment for immobilizing the assembly (4) to the bearing plane (9) comprises a coupling element (18) and a remote end of the assembly (4) includes a coupling element for coupling the assembly (4) to the transportedvehicle.

14. The securing device according to claim 13, wherein the tensioning and retaining mechanism (3) is temporarily attached onto or in a structure of the bearing plane or a bearing floor of a transport vehicle.

15. The securing device according to claim 1, wherein the tensioning and retaining mechanism (3) comprises a winding axle (10).

16. The securing device according to claim 15, wherein the winding axle (10) is made to rotate by one of a ratchet and rotatable mechanism (11).

17. The securing device according to claim 16, wherein a section of the winding axle (10) is non-circular and comprises one or more sliding winding components (15) provided for holding the tensioning end (6) of the link (2).

18. The securing device according to claim 17, wherein each sliding winding component (15) has a central passage with a non-circular section through which the sliding winding component (15) is mounted on the winding axle (10) and the non-circular section has a shape that is complementary to a shape of the winding axle (10).

19. The securing device according to claim 1, wherein the coupling and transmission assembly (4) comprises two separable parts, including a hook holder assembly (16) and a separable transmission part (17).

20. The securing device according to claim 19, wherein the hook holder assembly (16) has at least one swivel hook (18) on a front face.

21. The securing device according to claim 19, wherein the hook holder assembly (16) has raised ends, each of which comprises one of a rolling, a sliding or a slipping bearing surface for the link (2).

22. The securing device according to claim 21, wherein each of the raised ends has one of a rolling axle or an inverted U-shaped branch (19, 20) that bears against one of the rolling, the sliding or the slipping bearing surface for the link (2).

23. The securing device according to claim 22, wherein the hook holder assembly (16) is shaped behind between two raised ends into a receiving space (21) in which the separable transmission part (17) is one of housed, fitted or nested.

24. The securing device according to claim 19, wherein the hook holder assembly (16) enables production of a loop (22) with the link (2) with upward movement transmission.

25. The securing device according to claim 20, wherein the hook holder assembly (16) forms, with the link (2), a downward movement transmission module when the at least one swivel hook (18) thereof is hooked with the bearing plane (9).

26. The securing device according to claim 19, wherein the separable transmission part (17) has one of a U-shaped branch or a rolling axle (23) for allowing the link (2) to move.

27. The securing device according to claim 19, wherein the separable transmission part (17) comprises at least one of a hook (24) and an adapter (25) to anchor the separable transmission part (17) to the anchoring point (13) of the chassis (14) of the transported vehicle.

28. The securing device according to claim 1, wherein the transported vehicle is secured on the bearing plane via a tire of the wheel.

29. The securing device according to claim 1, wherein the transported vehicle is secured on the bearing plane via at least one anchoring point on the chassis of the transported vehicle.

30. The securing device according to claim 1, wherein the transported vehicle is secured on the bearing plane via both the tire of the wheel and at least one anchoring point on the chassis of the transported vehicle.

* * * * *